Jan. 11, 1944.  J. JANDASEK  2,339,015
FLUID DRIVE
Filed May 31, 1941  2 Sheets-Sheet 1

INVENTOR.
JOSEPH JANDASEK
BY
ATTORNEY

Jan. 11, 1944. J. JANDASEK 2,339,015
FLUID DRIVE
Filed May 31, 1941 2 Sheets-Sheet 2

INVENTOR.
JOSEPH JANDASEK
BY
ATTORNEY

Patented Jan. 11, 1944

2,339,015

UNITED STATES PATENT OFFICE 2,339,015

FLUID DRIVE

Joseph Jandasek, Detroit, Mich., assignor to Bendix Aviation Corporation, Detroit, Mich., a corporation of Delaware Application May 31, 1941, Serial No. 396,131

10 Claims. (Cl. 74—189.5)

This invention relates to fluid drives.

Broadly, the invention comprehends a transmission including means for transmission of force in a plurality of paths converging and combining to enhance the total output of force.

An object of the invention is to provide a driving shaft and a driven shaft and coupling means for the shafts providing a plurality of paths for power flow effective to introduce torque multiplication in the coupling.

An object of the invention is to provide a driving shaft and a driven shaft and coupling means for the shafts providing a plurality of paths for power flow introducing torque multiplication in the coupling and means operative at will for eliminating some of the paths.

Other objects and advantages of the invention will appear from the following description taken in connection with the drawings forming a part of this specification, and in which—

Figure 1:
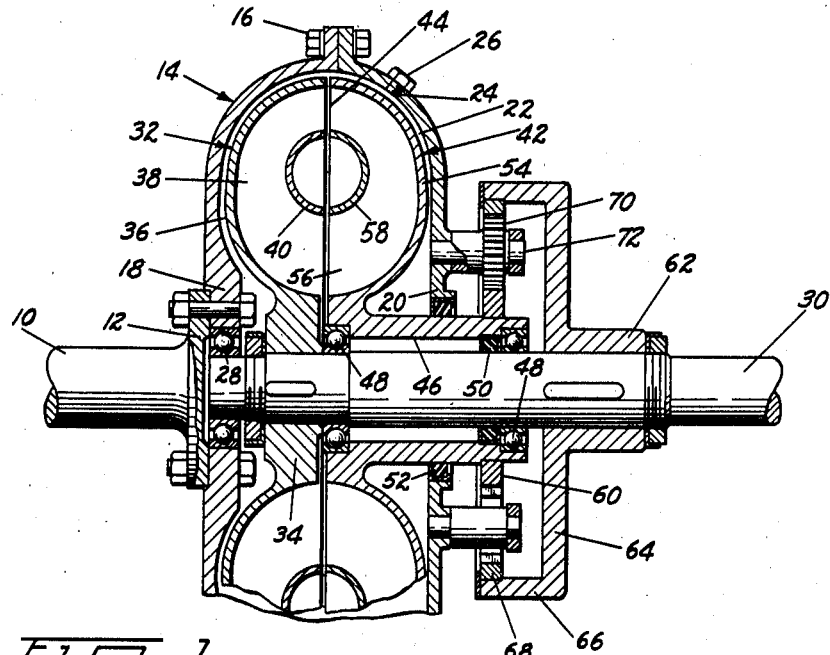
Fig. 1 is a vertical sectional view of a fluid drive embodying the invention.

Referring to Fig. 1 of the drawings, 10 represents a driving shaft having a flange 12. A housing 14 having two parts suitably secured together as by bolts 16 has a concentrically disposed hub 18 bolted or otherwise secured to the flange 12 of the driving shaft and a hub 20 oppositely disposed with relation to the hub 18. This housing provides a reservoir 22 having a filling opening 24 normally closed as by a plug 26.

A bearing 28 fitted in the hub 18 of the housing supports for rotation a driven shaft 30 extended through the hub 20 and beyond the wall of the housing. A turbine indicated generally at 32 is keyed or otherwise fixedly secured to the driven shaft 30 within the housing. The turbine 32 includes a hub 34 supporting a shroud 36 having thereon vanes 38 supporting an inner shroud 40.

An impeller indicated generally at 42 mounted for rotation on the driven shaft 30 with the housing in oppositely disposed relation to the turbine provides in conjunction with the turbine a vortex chamber 44. The impeller includes a sleeve 46 supported on spaced bearings 48 mounted on the driven shaft 30 with a fluid seal 50 interposed between the bearings. The sleeve 46 extends through the hub 20, and interposed between the hub and the sleeve is a fluid seal 52. The sleeve 46 has thereon a shroud 54, and arranged on this shroud are blades 56 supporting an inner shroud 58, and a sun gear 60 is secured to the sleeve 46 outside of the housing.

A hub 62 keyed or otherwise secured to the driven shaft has thereon a disc 64 provided with a flange 66 supporting a ring gear 68, and spaced planet pinions 70 mounted for rotation on stub shafts 72 on the housing mesh with the sun gear 60 and the ring gear 68.

In a normal operation, force is transmitted through the driving shaft 10 to the housing 14 thence through the planetary pinions 70 and ring gear 68, and the disc supporting the gear 68 to the driven shaft resulting in driving the driven shaft; and force is also transmitted by the planetary gearing to the impeller, resulting in driving the impeller against the turbine, and this results in transmission of added force to the driven shaft.

Figure 2:
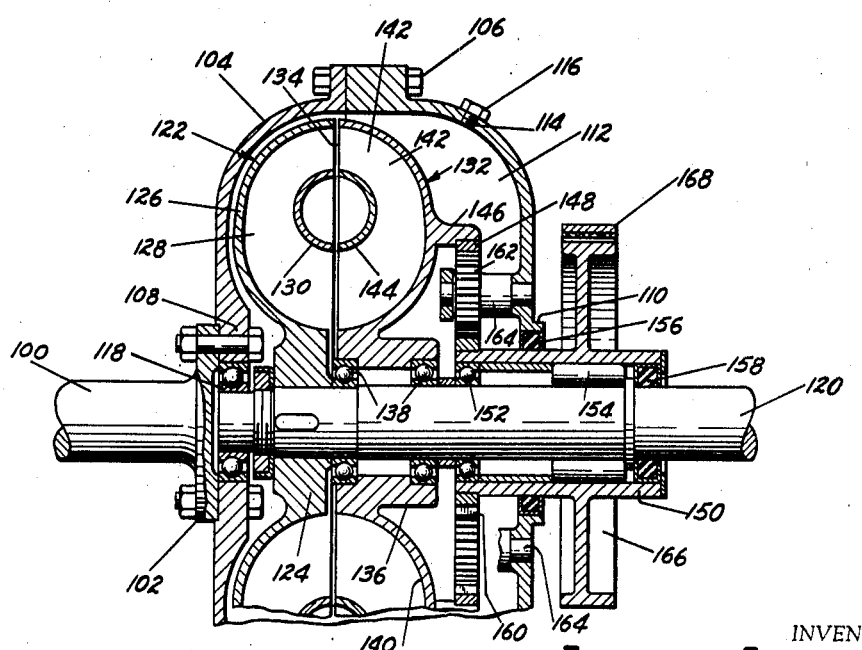
Fig. 2 is a similar view illustrating a modification of the invention.

Referring to Fig. 2 of the drawings, 100 represents a driving shaft having a flange 102. A housing 104 having two parts secured together as by bolts 106 has a concentric hub 108 suitably secured to the flange 102 of the driving shaft and a hub 110 oppositely disposed with relation to the hub 108. The housing 104 provides a reservoir 112 having a filling opening 114 normally closed as by a plug 116.

A suitable bearing 118 fitted in the hub 108 of the housing supports for rotation a driven shaft 120 extended through the hub 110 and beyond the wall of the housing, and a turbine indicated generally at 122 includes a hub 124 fixedly secured to the driven shaft 120, and a shroud 126 supported on the hub having secured thereon a plurality of vanes 128 supporting an inner shroud 130.

An impeller indicated generally at 132 is associated with the turbine 122, and provides in conjunction therewith a vortex chamber 134 receiving fluid from the reservoir. The impeller includes a hub 136 supported for rotation on suitable spaced bearings 138 mounted on the driven shaft 120. The hub has thereon a shroud 140 having arranged thereon blades 142 supporting an inner shroud 144 and a laterally extended flange 146 having secured thereto an orbit gear 148.

A sleeve 150 slipped over the driven shaft 120 is supported for rotation on a bearing 152 and a one way clutch 154. This sleeve extends through the hub 110 partly within the housing and partly outside of the housing. A sealing member 156 is interposed between the hub and the sleeve, and another sealing member 158 is interposed between the sleeve and the driven shaft. These sealing members inhibit seepage of fluid from the housing. The sleeve 150 has secured thereto within the housing a sun gear 160, and spaced planet pinions 162 mounted on stub shafts 164 in mesh with the orbit gear 148 on the shroud 140 of the impeller 132 and with the sun gear 160 on the sleeve 150, and a brake drum 166 on the sleeve 150 has a brake 168 associated therewith.

In a normal operation, transmission of force through the driving shaft 100 to the housing 104 results in rotation of the housing and the consequent transmission of force through the planet pinions 162 and sun gear 160 to the sleeve 150, and thence through the one way clutch 154 to the driven shaft 120. During this operation resistance is offered to movement of the orbit gear 148 by the fluid in the vortex chamber, and simultaneously, force is transmitted from the planet pinions 162 through the orbit gear 148 to the impeller resulting in driving the impeller. This results in energizing the fluid in the vortex chamber 134 and the energy of the fluid so energized is received by the turbine 122, resulting in the transmission of additional force to the driven shaft 120.

When it is desired to effect an overdrive, the brake 168 is applied or set to lock the drum 166 against rotation. This results in holding the sleeve 150 stationary, and under this condition the unit becomes purely a fluid drive, wherein force transmitted from the driving shaft 100 to the housing 104 results in driving the planet pinions 162 in mesh with the sun gear 160, now stationary, and the orbit gear 148 to the impeller, resulting in further energizing the fluid in the vortex chamber, and this increased energy of the fluid is received by the turbine 122 and transmitted to the driven shaft 120.

Figure 3:
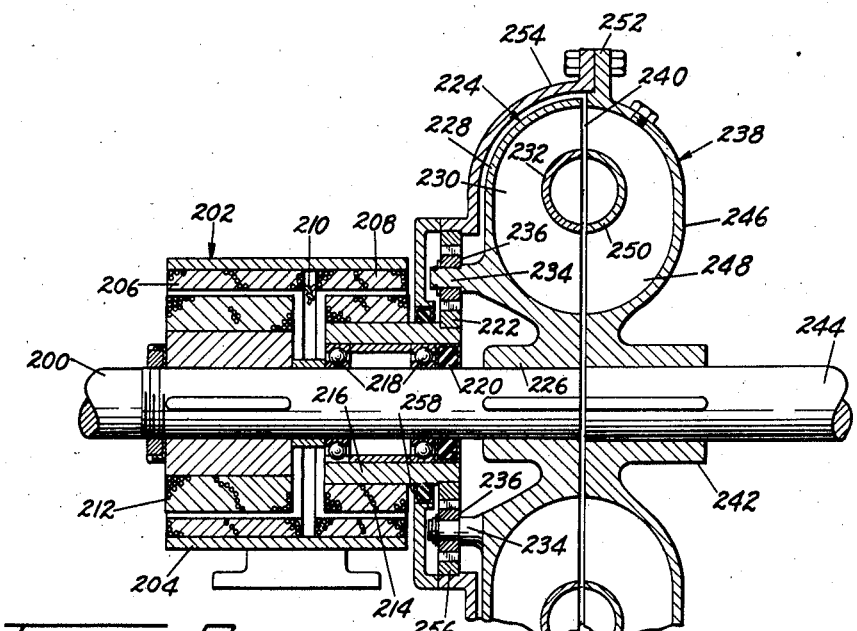
Fig. 3 is another similar view illustrating a further modification of the invention.

Now, referring to Fig. 3 of the drawings, a driving shaft 200 has mounted thereon an electrical motor and generator indicated generally at 202. As shown, a stator 204 suitably held against rotation concentrically of the shaft has thereon two separate windings 206 and 208 connected by a lead 210, the former cooperating with an armature 212 of the motor carried on the driving shaft, and the latter cooperating with an armature 214 of the generator.

The armature 214 of the generator is mounted on a sleeve 216 supported for rotation on suitable spaced bearings 218 fitted on the driving shaft 200, and interposed between the sleeve and the shaft is a sealing member 220, and the sleeve has suitably secured thereto a sun gear 222, the purpose of which will hereinafter appear.

The driving shaft 200 has suitably secured thereto an impeller indicated generally at 224. As shown, the impeller includes a hub 226, keyed to the driving shaft. The hub has thereon a shroud 228, and arranged on this shroud is a plurality of blades 230 supporting an inner shroud 232, and spaced laterally extended stub shafts 234 on the shroud support for rotation planet pinions 236 in mesh with the sun gear 222 on the sleeve 216.

A turbine indicated generally at 238 is associated with the impeller and provides in conjunction therewith a vortex chamber 240 for the circulation of fluid. The turbine includes a hub 242 splined to a driven shaft 244 in axial alignment with the driving shaft. The hub has thereon a shroud 246, and arranged on this shroud is a plurality of vanes 248 supporting an inner shroud 250, and the shroud 248 has a circumferential flange 252 supporting a housing 254 surrounding the back of the impeller. The housing has suitably secured thereto a ring gear 256 in mesh with the planet pinions 236, and the housing also has a concentric opening for the reception of the sleeve 216, and fitted in this opening is a sealing member 258 for inhibiting seepage of fluid from the vortex chamber.

In a normal operation, transmission of force through the driving shaft 200 to the impeller 224 results in rotation of the impeller. This motion of the impeller energizes the fluid in the vortex chamber 240, and the energy of the fluid is received by the turbine 238 and transmitted to the driven shaft. Simultaneously the impeller 224 drives the planet pinions 236, and these pinions transmit force to the sun gear 222, resulting in energization of the generator and the delivery of current generated thereby to the motor and the transmission of force from the motor to the driving shaft, thence to the impeller, and concomitantly with this operation force is transmitted from the planetary gears 236 through the ring gear 256 and the housing 254 to the turbine 238 connected thereto, and through the shroud 246 of the turbine to the driven shaft.

Figure 4:
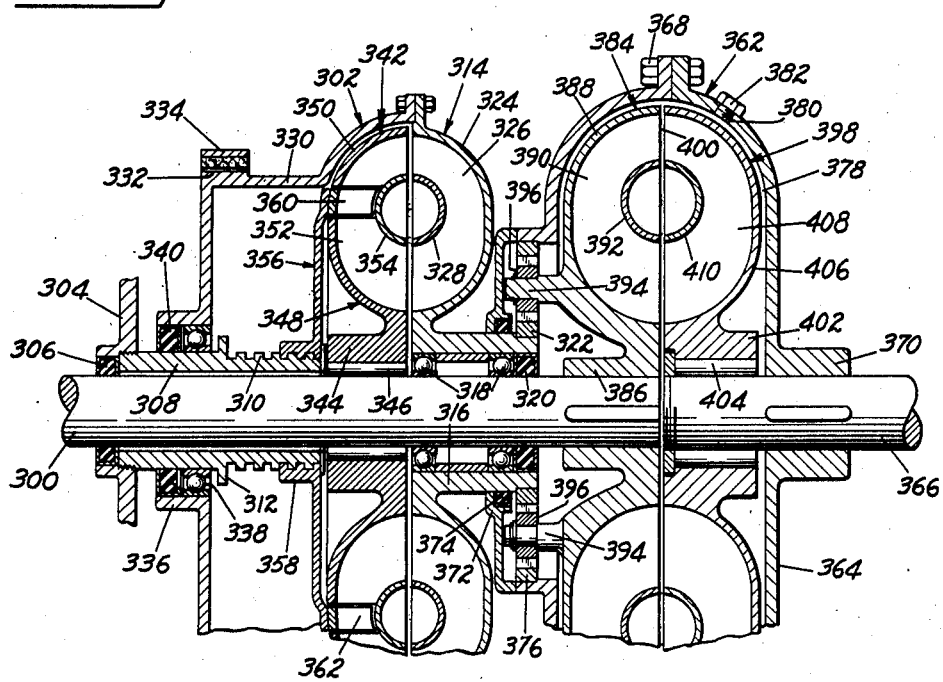
Fig. 4 is yet another similar view illustrating a still further modification of the invention.

Referring now to Fig. 4, a driving shaft 300 supports a torque converter indicated generally at 302. As shown, a driving shaft 300 extends through the wall of a crank shaft case 304 with a suitable sealing member 306 interposed between the case and the shaft. A sleeve 308 slipped over the shaft and fixedly secured to the case 304 has thereon threads 310 and a stop 312; the purpose of this sleeve will hereinafter appear.

The torque converter 302 includes an impeller indicated generally at 314, and, as shown, the impeller includes a hub 316 supported for rotation on spaced bearings 318 fitted on the driving shaft 300, and a suitable sealing member 320 fitted in the hub embraces the shaft. The hub has thereon a sun gear 322, the purpose of which will hereinafter appear, and a shroud 324, and arranged on the shroud is a plurality of blades 326 supporting an inner shroud 328. The shroud 324 has a circumferential flange, and secured to this flange is a housing 330 having thereon a braking surface 332 suitable for cooperation with a brake 334, and a concentrically disposed hub 336. This hub has therein a suitable bearing 338 fitted on the sleeve 308, and a sealing member 340 embracing the sleeve.

A two-stage turbine indicated generally at 342 is associated with the impeller and provides in conjunction therewith a vortex chamber for circulation of fluid. The turbine includes a hub 344 mounted on a one-way clutch 346 supported on the driving shaft 300. The hub 344 has thereon a shroud 348 supporting the first and second stages 350 and 352 of the turbine secured to one another by an inner shroud 354, and a reaction member 356 movable between the stages of the turbine includes a carrier 358 mounted for travel on the screw threads 310 on the sleeve 308, and the carrier has thereon a web supporting a plurality of vanes 360 movable into and out of the vortex chamber between the first and second stages of the turbine.

A fluid clutch indicated generally at 362 includes a housing 364 supported on a driven shaft 366 axially aligned with the driving shaft 300. As shown, the housing has two parts suitably secured together as by bolts 368. One of the parts has a concentrically disposed hub 370 splined to the driven shaft, and the other part has a hub 372 oppositely disposed with relation to the hub 370, and the hub 372 has therein a fluid seal 374 embracing the hub 316 of the impeller 314 of the torque converter, and the housing has secured thereto an orbit gear 376. The housing constitutes a fluid reservoir 378 having a filling opening 380 normally closed by a plug 382.

An impeller indicated generally at 384 is mounted on the driving shaft within the housing 364. The impeller includes a hub 386 splined to the driving shaft. The hub has thereon a shroud 388, and arranged on the shroud is a plurality of blades 390 supporting an inner shroud 392. The shroud 388 also has thereon spaced stub shafts 394, supporting for rotation planet pinions 396 in mesh with the sun gear 322, and the orbit gear 376. A turbine indicated generally at 398 is associated with the impeller 384 and provides in conjunction therewith a vortex chamber 400 for circulation of fluid. This turbine includes a hub 402 mounted for rotation on a one way clutch 404 fitted on the driven shaft 366, and the hub 402 has thereon a shroud 406 having secured thereto a plurality of vanes 408 supporting an inner shroud 410.

In a normal operation, transmission of force through the driving shaft 300 to the impeller 384 of the fluid clutch results in energization of the fluid in the vortex chamber 400 and the energy of the fluid is received by the turbine 398 of the fluid clutch, resulting in rotation of the turbine and transmission of force therefrom through the one way clutch 404 to the driven shaft 366, causing rotation thereof.

During this operation, the housing of the fluid clutch 362 rotates with the driven shaft, and this movement of the housing is transmitted through the planetary gears 322, 376 and 396 to the impeller 314 of the torque converter, resulting in driving the impeller.

Actuation of the impeller 314 of the torque converter results in the energization of the fluid, and the energy of the fluid is received on the first and second stages of the turbine and also on the reaction vanes 360 causing rotation of the turbine and the transmission of force therefrom through the one way clutch 346 to the driving shaft.

As the speed of rotation of the impeller 314 increases, the energy of the fluid increases proportionately, and this increased energy of the fluid acting on the stages of the turbine causes increase in speed of the turbine. As this increase of speed approaches that of the impeller, the angle of the fluid leaving the first stage of the turbine shifts from impinging on the faces of the reaction vanes 360 to impinging upon the backs of the reaction vanes 360.

This causes the reaction member 356 to spiral on the threads 310 of the fixed member 308, resulting in retraction of the reaction member out of the fluid circuit, and, thereafter, the torque converter 302 functions as a fluid coupling for transmitting force through the one way clutch 346 to the driving shaft. Under this condition power flows from the driving shaft 300 to the driven shaft 366 through three paths; that is, from the driving shaft 300 through the fluid clutch 362, and the one way clutch 404 to the driven shaft, and simultaneously from the driving shaft 300 through planetary gears 322, 376, and 396 and fluid clutch housing to the driven shaft and concomitantly therewith power flows from the planetary gears, and the torque converter 302 actuated thereby through the one way clutch 346 to the driving shaft 300; thence through the fluid clutch and the one way clutch 404 to the driven shaft.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A transmission comprising a driving shaft and a driven shaft, means for coupling the shafts including mechanical means, and a fluid power transmitting means, and a second fluid power transmitting means coupling the mechanical means to the driving shaft.

2. A transmission comprising a driving shaft and a driven shaft, duplex fluid power transmitting means each having a driving and a driven element, a gearing system connecting the driving elements to one another and to the driven shaft, and means coupling the driven elements respectively to the driving and driven shafts.

3. A transmission comprising a driving shaft and a driven shaft, a pair of fluid power transmitting means each having a driving and a driven element, a gearing system coupling the fluid power transmitting means, and means for connecting the driven elements of the fluid power transmitting means respectively to the driving and driven shafts.

4. A transmission comprising driving and driven shafts, individual fluid power transmitting means each having a driving and a driven element, a gearing system connecting the shafts and the fluid power transmitting means, and one-way drives connecting the driven elements of the fluid power transmitting means respectively to the driving and driven shafts.

5. A transmission comprising driving and driven shafts, individual fluid power transmitting means each including cooperative driving and driven elements, a gearing system connecting the shafts and the fluid power transmitting means, one-way drives connecting the driven elements respectively to the driving and driven shafts, and control means for the gearing system providing for speed increase of the driven shaft.

6. A transmission comprising a driving shaft and a driven shaft, independent fluid power transmissions each including a housing enclosing cooperative driving and driven elements, the housing of one of the transmissions being fixedly secured to the driven shaft, a gearing system connecting the transmission including a sun gear secured to one of the driving elements, planet pinions carried by the other driving element, and an orbit gear carried by the housing secured to the driven shaft, and means connecting the driven elements respectively to the driving and driven shafts.

7. A transmission comprising a driving and a driven shaft, two fluid power transmissions each including a housing enclosing cooperative driving and driven elements, the housing of one of the transmssions being secured to the driven shaft, a planetary gear system connected to the housing and to the driving elements, one-way drives connecting the driven elements respectively to the driving and driven shafts, and control means for the gear system providing speed increase of the driven shaft.

8. A transmission comprising a driving and a driven shaft, two fluid power transmissions each including a housing enclosing cooperative driving and driven elements, one of the transmissions having its housing secured to the driven shaft, a planetary gear system connected to the housing secured to the driven shaft and to the driving elements, and means connecting the driven elements respectively to the driving and driven shafts.

9. A transmission comprising a driving and a driven shaft, two fluid power transmissions each including cooperative driving and driven elements, one-way drives connecting the driven elements respectively to the driving and driven shafts, and a gearing system connecting the driving and driven shafts and the driving elements providing for two paths of power flow from the driving shaft to the driven shaft and another path of power flow through one of the transmissions back to the driving shaft.

10. A transmission comprising a driving and a driven shaft, a fluid power transmission including a driving element secured to the driving shaft and a cooperative driven element connected to the driven shaft providing a path of power flow from the driving to the driven shaft, a second fluid power transmission including a driving element and a cooperative driven element connected to the driving shaft, and a planetary gear system including pinions carried by the driving element of the first mentioned transmission, an orbit gear connected to the driven shaft and in mesh with the pinions providing a second path of power flow from the driving shaft to the driven shaft, and a sun gear carried by the driving element of second mentioned transmission and in mesh with the pinions providing a third path of power flow from the driving shaft through the planetary gear and second mentioned transmission back to the driving shaft.

JOSEPH JANDASEK.